(12) United States Patent
Smith et al.

(10) Patent No.: US 8,155,027 B2
(45) Date of Patent: Apr. 10, 2012

(54) DYNAMIC SYSTEM AND METHOD OF ESTABLISHING COMMUNICATION WITH OBJECTS

(75) Inventors: Timothy D. Smith, Arlington, VA (US); Nina L. Stewart, Clifton, VA (US)

(73) Assignee: Raytheon Company, Waltham, MA (US)

( * ) Notice: Subject to any disclaimer, the term of this patent is extended or adjusted under 35 U.S.C. 154(b) by 1327 days.

(21) Appl. No.: 11/185,282

(22) Filed: Jul. 20, 2005

(65) Prior Publication Data

US 2007/0019555 A1    Jan. 25, 2007

(51) Int. Cl.
*H04L 12/28* (2006.01)
(52) U.S. Cl. ............... 370/254; 370/238; 370/400
(58) Field of Classification Search ............ 370/254, 370/255, 331; 716/13
See application file for complete search history.

(56) References Cited

U.S. PATENT DOCUMENTS

| | | | |
|---|---|---|---|
| 5,711,003 A * | 1/1998 | Dupuy | 455/436 |
| 5,978,365 A * | 11/1999 | Yi | 370/331 |
| 6,018,662 A * | 1/2000 | Periyalwar et al. | 455/442 |
| 6,256,295 B1 * | 7/2001 | Callon | 370/254 |
| 6,304,556 B1 * | 10/2001 | Haas | 370/254 |
| 6,321,090 B1 * | 11/2001 | Soliman | 455/440 |
| 6,781,960 B1 * | 8/2004 | Charas | 370/255 |
| 6,904,024 B1 | 6/2005 | Boch et al. | |
| 7,076,274 B2 * | 7/2006 | Jollota et al. | 455/561 |
| 7,286,489 B2 * | 10/2007 | Ades | 370/254 |
| 2004/0088670 A1 * | 5/2004 | Stevens et al. | 716/13 |

FOREIGN PATENT DOCUMENTS

| | | | |
|---|---|---|---|
| EP | 1134939 | * | 9/2001 |
| EP | 1134939 A1 | | 9/2001 |
| EP | 1134939 A1 | * | 9/2001 |
| WO | WO 01/61927 A1 | | 8/2001 |
| WO | WO03/017591 A1 | * | 2/2003 |
| WO | WO03/017591 A1 | | 2/2003 |

OTHER PUBLICATIONS

PCT Notification of Transmittal of the International Search Report and the Written Opinion of the International Searching Authority, or the Declaration, PCT/US2006/028432, 16 pages.
*Australian Government; IP Australia; Examiner's First Report* for Patent Application No. 2006269862; 2 pages, Jan. 27, 2010.

* cited by examiner

*Primary Examiner* — Dang Ton
*Assistant Examiner* — Pamit Kaur
(74) *Attorney, Agent, or Firm* — Schwegman, Lundberg & Woessner, P.A.

(57) ABSTRACT

According to an embodiment of the invention, a method of dynamically creating a network of a plurality of nodes operable to communicate with objects in operating sectors comprises establishing a first communication link between a first node and a second node of the plurality of nodes. The first communication link is established upon determining that the first communication link between the respective ones of the plurality of nodes would not cross an existing communication link in the network of the plurality of nodes between two of the plurality of nodes or upon determining that the first communication link would be shorter than any existing communication link in the network of the nodes between two of the plurality of nodes that the first communication link would cross. The first communication link has a first communicative line of sight between the first node and the second node.

18 Claims, 6 Drawing Sheets

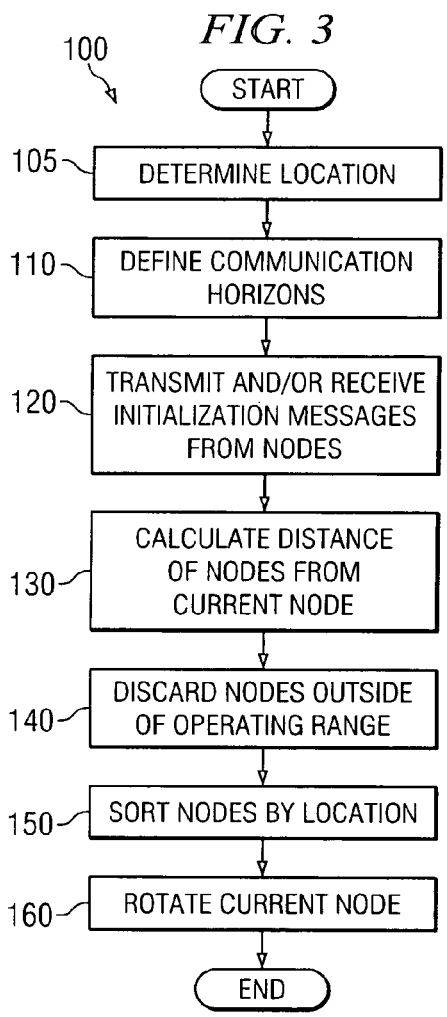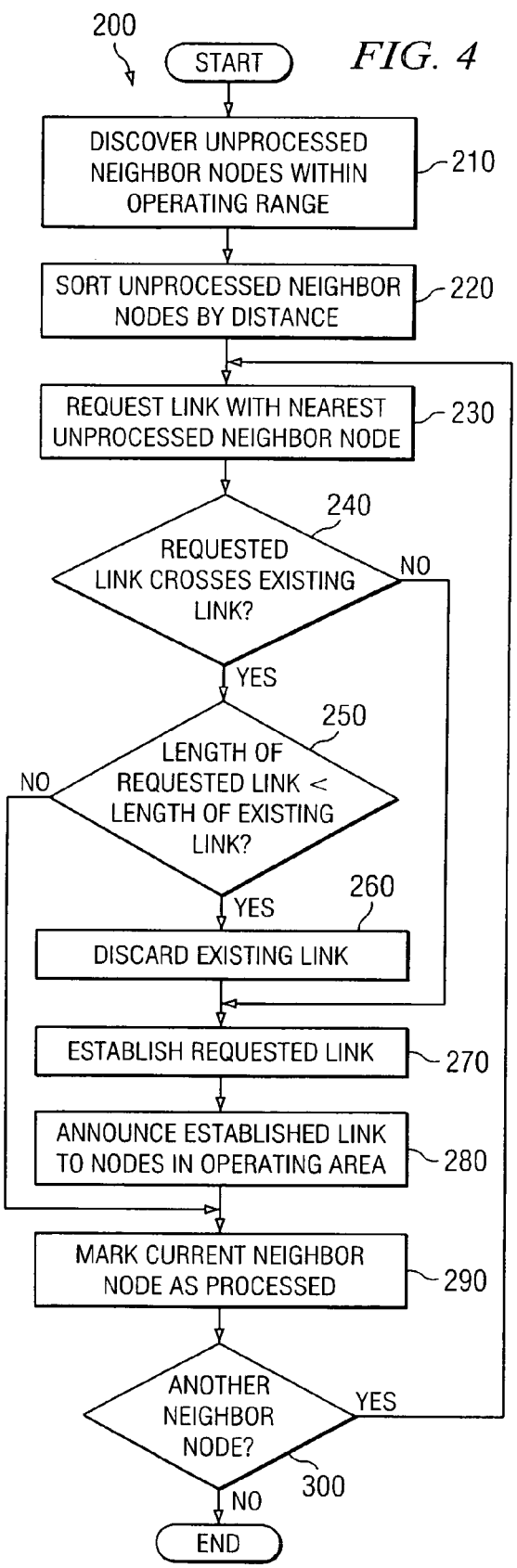

DYNAMIC SYSTEM AND METHOD OF ESTABLISHING COMMUNICATION WITH OBJECTS

TECHNICAL FIELD OF THE INVENTION

This invention relates generally to the field of communications and, more particularly, to a dynamic system and method of establishing communications with objects.

BACKGROUND OF THE INVENTION

Communication systems may comprise nodes that communicate with objects in a particular region. For a variety of reasons, such nodes can become damaged. For example, in a combat setting, a tower acting as a node and attempting to clear air space by removing objects from a particular region may become destroyed. With such an occurrence, the ability to clear the air space for the desired region may become extremely difficult, if not impossible, without setting up a new node.

SUMMARY OF THE INVENTION

According to an embodiment of the invention, a method of dynamically creating a network of a plurality of nodes operable to communicate with objects in operating sectors comprises establishing a first communication link between a first node and a second node of the plurality of nodes. The first communication link is established upon determining that the first communication link between the respective ones of the plurality of nodes would not cross an existing communication link in the network of the plurality of nodes between two of the plurality of nodes or upon determining that the first communication link would be shorter than any existing communication link in the network of the nodes between two of the plurality of nodes that the first communication link would cross. The first communication link has a first communicative line of sight between the first node and the second node.

Certain embodiments of the invention may provide numerous technical advantages. For example, a technical advantage of one embodiment may include the capability to provide redundancy among operating sectors to compensate for a node that becomes non-operational. A technical advantage of another embodiment may include the capability to provide a self-organizing network. A technical advantage of yet another embodiment may include the capability to provide a self-healing network. A technical advantage of yet another embodiment may include the capability to provide a routing that allows nodes to not be in communication with a central controller.

Although specific advantages have been enumerated above, various embodiments may include all, some, or none of the enumerated advantages. Additionally, other technical advantages may become readily apparent to one of ordinary skill in the art after review of the following figures and description.

BRIEF DESCRIPTION OF THE DRAWINGS

For a more complete understanding of example embodiments of the present invention and its advantages, reference is now made to the following description, taken in conjunction with the accompanying drawings, in which:

FIG. 3 is a flowchart illustrating a process of alignment and discovery of nodes, according to an embodiment of the invention;

FIG. 4 is a flowchart illustrating a process of linking nodes, according to an embodiment of the invention;

DETAILED DESCRIPTION OF EXAMPLE EMBODIMENTS OF THE INVENTION

It should be understood at the outset that although example embodiments of the present invention are illustrated below, the present invention may be implemented using any number of techniques, whether currently known or in existence. The present invention should in no way be limited to the example embodiments, drawings, and techniques illustrated below, including the embodiments and implementation illustrated and described herein. Additionally, the drawings are not necessarily drawn to scale.

Figure 1:
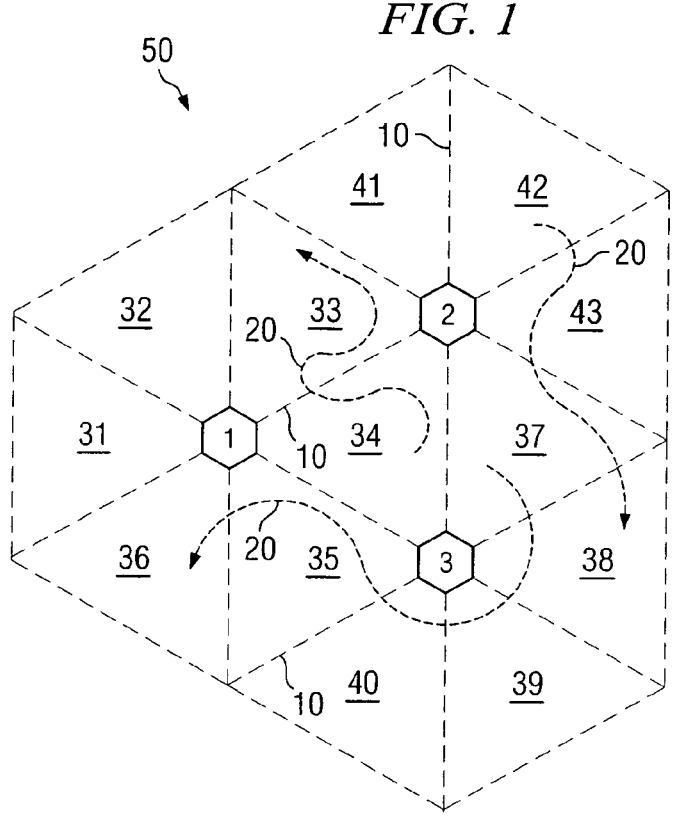
FIG. 1 illustrates a portion of a communication system, according to an embodiment of the invention.

FIG. 1 illustrates a portion 50 of a communication system, according to an embodiment of the invention. The portion 50 of the communication system in the embodiment of FIG. 1 includes control stations or nodes 1, 2, and 3. Each control station or node 1, 2, and 3 has an operating region respectively associated therewith. The operating region of each node 1, 2, and 3 in this embodiment is divided into six operating sectors. Node 1's operating region includes operating sectors 31, 32, 33, 34, 35, and 36. Node 2's operating region include operating sectors 41, 42, 43, 37, 34, and 33. Node 3's operating region includes operating sectors 37, 38, 39, 40, 35, and 34.

The nodes 1, 2, and 3, among other items, may be operable to communicate with objects 20 in their respective operating regions or sectors. Such communication may include one-way communication such as sensing movement or location of objects 20 and/or two-way communication such as sending and receiving signals or commands to/from the objects 20. With such communication, the nodes 1, 2, and 3 in some embodiments may control and/or monitor activity of objects 20 within their particular operating regions or sectors. For example, as the objects 20 moves between operating regions or sectors, the nodes 1, 2, and 3 may coordinate with one another to hand off the communication with objects 20 to another node operating another operating region or operating sector. As an example, node 3 may be communicating with an object 20 in operating sector 34. As the object 20 moves into operating sector 33, the communication with the particular object 20 will be handed off to nodes that communicate operating sector 33, for example, one of nodes 1 or node 2 or both. Further details of such communication will be described below.

As can be seen in FIG. 1, operating sector 34 is triply redundant. That is, three control stations or nodes 1, 2, and 3 may communicate with objects 20 in operating sector 34.

Preferably, only one of the nodes 1, 2, and 3, will maintain primary communication with a particular object 20 in the operating sector 34 while the remaining two nodes will maintain redundant communication with the particular object 20 in operating sector 34. Teachings of embodiments of the invention recognize a system and method that compensate for situations in which a node maintaining primary communication with a particular object becomes damaged or shuts down by allowing one of the other two redundant communication nodes to take over primary communication with the particular object. Teaching of embodiments of the invention additionally recognize a system and method that dynamically adjusts for addition and removal of nodes in a communication system.

Nodes X, Y, an Z may communicate with one another via one or more communication links 10. For purposes of illustration, the communications links 10 are shown as a lines of sight between the nodes.

The communication links 10 and the communication of the nodes X, Y, and Z with the objects 20 within an operating region and/or sector may include any suitable communication, including but not limited to, radio networks, a public or private data network; a local area network (LAN); a metropolitan area network (MAN); a wide area network (WAN); a wireline or wireless network; a local, regional, or global communication network; a satellite network; an enterprise intranet; other suitable communication links; or any combination of the preceding.

The communication links 10 and the communication of the nodes X, Y, and Z with the objects 20 within an operating region and/or sector may additionally utilize any of a variety of security techniques to ensure that only intended objects, recipients, and/or nodes receive a communicated message. As one example, the communication links 10 and the communication of the nodes X, Y, and Z with the objects 20 within an operating region and/or sector may utilize encryption (for example, PKI, elliptical curve, or the like) between the nodes X, Y, and Z.

In addition to the above techniques of communication, in some embodiments the communication between the nodes X, Y, and Z and the objects 20 may include visual signaling to objects 20 or verbal communication with the objects 20. For example, the node may be a laptop computer operated by an individual who instructs movement or observes movement of another individual (the object 20).

A line of sight for the communication links 10 in some embodiments may define operating regions and operating sectors for which a particular control station or node may control. In other embodiments, a particular node may not have an operational boundary defined on one edge by a line of sight for a communication link 10. In such embodiments, for example, the control station or node may be on the edge of the portion 50 of the communication system. In such embodiments, the node or control station may utilize a maximum operational area as one boundary. Further details of creating boundaries for operating regions or sectors will be defined below with reference to FIGS. 2A and 2B.

Objects 20, according to embodiments of the invention, may include a virtual limitless number of items, including, but not limited ground vehicles, devices, people, devices associated with people, air vehicles such as unmanned air vehicles (UAV) or manned air vehicles. As one example of a control station operation, the control station may deconflict an air space for an air vehicle or aircraft upon receiving information that a particular aircraft will be flying through a particular operating sector controlled by the node. As another example, the node may sense the movement of a vehicle or a person.

The control stations or nodes 1, 2, and 3 may additionally include a virtual limitless number of items, including, but not limited to, a laptop computer, a ship, a vehicle, a tower, or the like.

For purposes of brevity, only three nodes 1, 2, and 3 are shown in FIG. 1. However, more control stations or nodes may be utilized according to various embodiments of the invention. Additionally, although six operating sectors define an operating region for a node in this embodiment, other embodiments may utilize more or less operating sectors for each node to define an operating region. For example, some embodiments may utilize nodes with five or less operating sectors. Other embodiments may utilize nodes with seven or more operating sectors. Yet further embodiments may utilize nodes with combinations of different numbers of operating sectors. For example, in such embodiments some nodes may have six operating sectors and other nodes may have seven operating sectors.

Figure 2A:
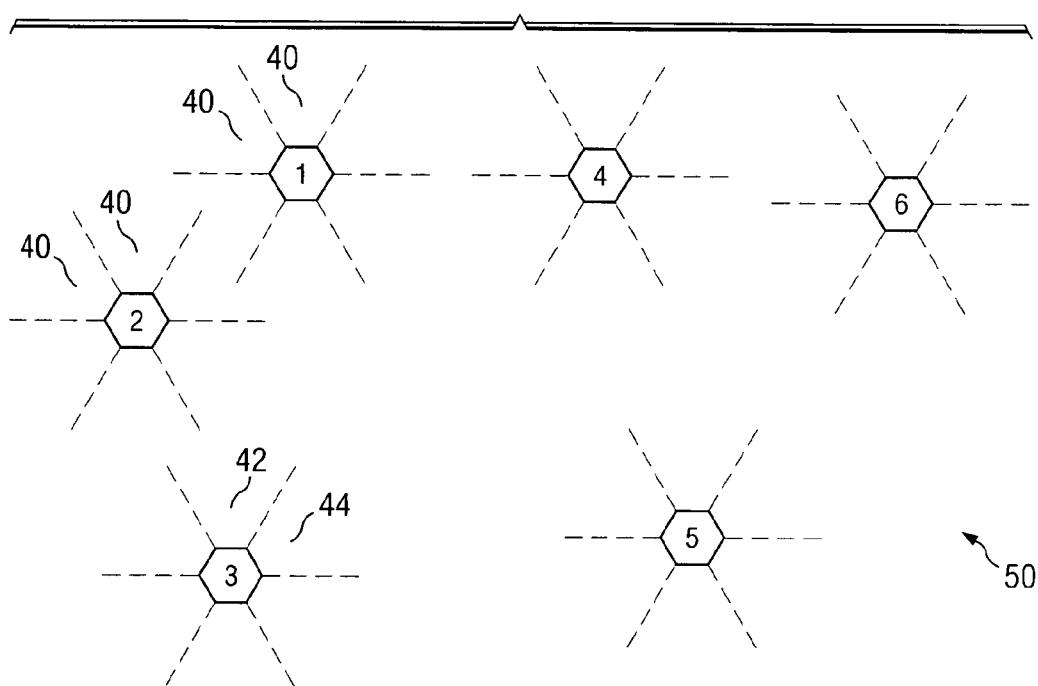
FIGS. 2A and 2B illustrate an alignment of a plurality of nodes in a portion of a communication system, according to an embodiment of the invention.
Figure 2B:
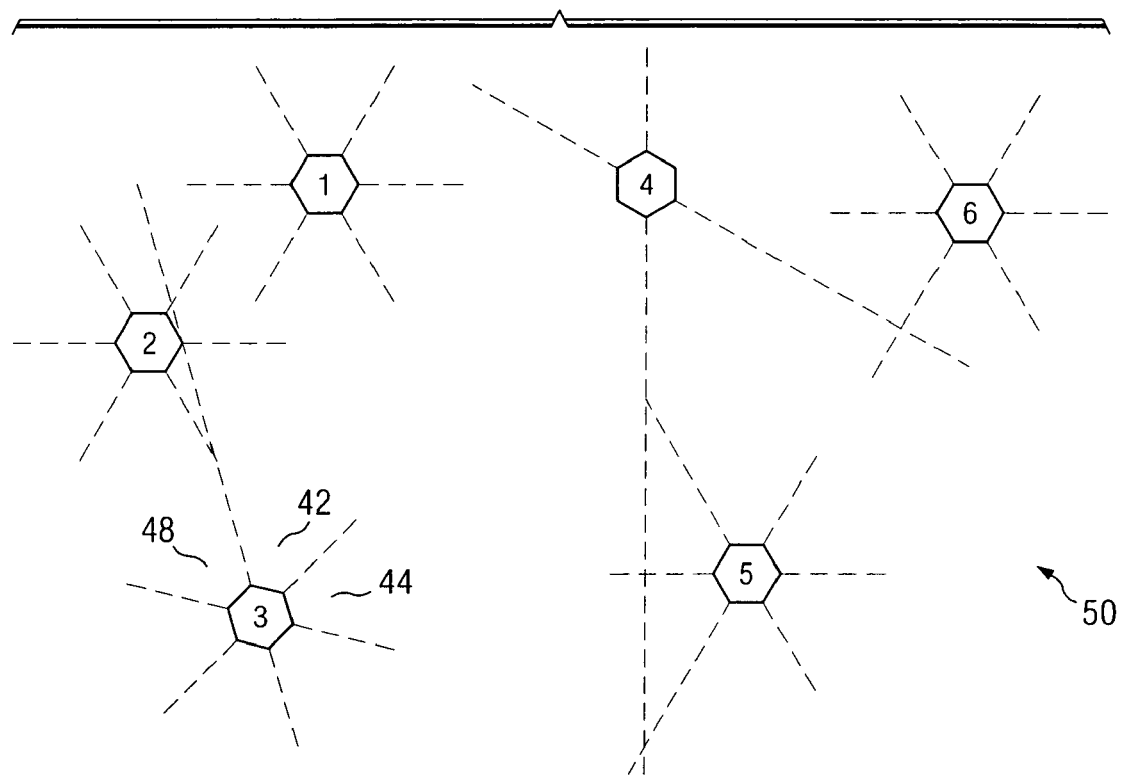

FIGS. 2A and 2B illustrate an alignment of a plurality of nodes in a portion of a communication system, according to an embodiment of the invention, while FIG. 3 is a flowchart illustrating a process of alignment and discovery of nodes, according to an embodiment of the invention. In operation, the portion 50 of the communication system may deploy a plurality of nodes 1 through 6. Each of the nodes 1 through 6 may seek to communicate with one another such that nodes 1 through 6 may form at least a portion 50 of a communication system. Accordingly, each node 1 through 6 may engage in a process 100 of FIG. 3 to align itself with respect to the location of other nodes.

After deployment of the nodes 1 through 6, each of the nodes 1 through 6 may determine their respective location at step 105. In determining a location, each of the nodes 1 through 6 in some embodiments may include any suitable location identification system, including, but not limited to, a global positioning system (GPS) receiver or other suitable location identification system. In other embodiments, the nodes 1 through 6 may be in communication with another device that determines the location of the node and accordingly informs the node of its location. For example, multiple nodes may determine their location and inform other nodes of their location based upon a communication signal sent on an electromagnetic wave to other nodes. The speed of the electromagnetic wave and timing may yield distance. Multiple distances from different nodes may yield a location. Location techniques such as these will be recognized by one of ordinary skill in the art. In particular embodiments, the nodes may additionally monitor their changing location, for example, if the nodes move.

After determining a location, each of the nodes 1 through 6 may form communication horizons 40 at step 110 as seen in FIG. 2A. In some embodiments, the initial defining of communication horizons 40 may be done in an arbitrary manner. In other embodiments, the defining of communication horizons 40 may be based upon the particular type of communication tools and/or techniques utilized on the node. For example, a particular node may have six sectored antennas, each antenna corresponding to a communication horizon 40. In FIG. 2A, each node has defined six communication horizons 40 for nodes 1 through 6.

After defining the communication horizons 40, each node may transmit and/or receive initialization messages at step 120. In particular embodiments, the initialization messages may be communication signals that inform other nodes of the transmitting node's location and desire to establish a communication link, if appropriate. After such transmittal and/or receipt of initialization messages, a particular node may calculate the distances of other nodes from the particular node's location at step 130 and discard nodes outside of the particular nodes operating range at step 140.

The process 100 may then proceed by sorting available nodes by location at step 150 and rotating the communication horizons 40 to a position, which optimizes communication with other nodes. For example, node 3 in the position of FIG. 2A has all the remaining nodes in one of two communication horizons 42 or 44. However, by rotating to the position of node 3 to the position shown in FIG. 2B, three communication horizons 48, 42, and 44 have nodes therein. In particular embodiments, the utilization of more communications horizons 40 optimizes communications.

Figure 2C:
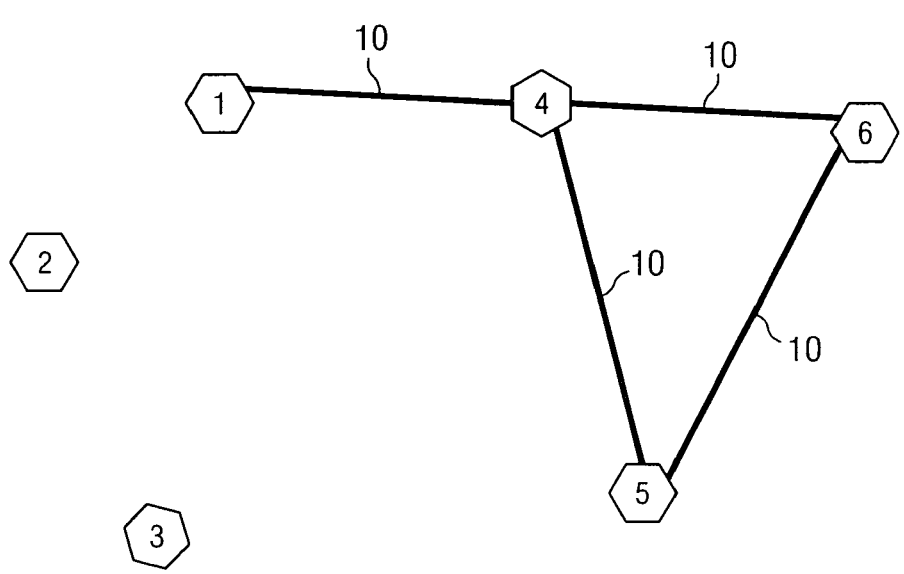
FIGS. 2C, 2D, and 2E illustrate a linkage of a plurality of nodes in a portion of a communication system, according to an embodiment of the invention.
Figure 2D:
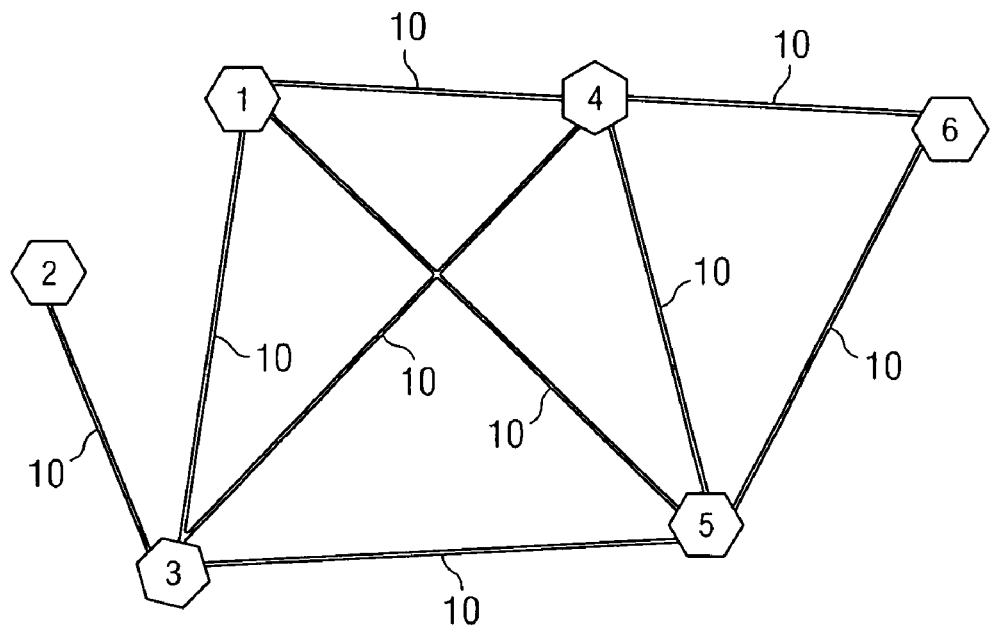
Figure 2E:
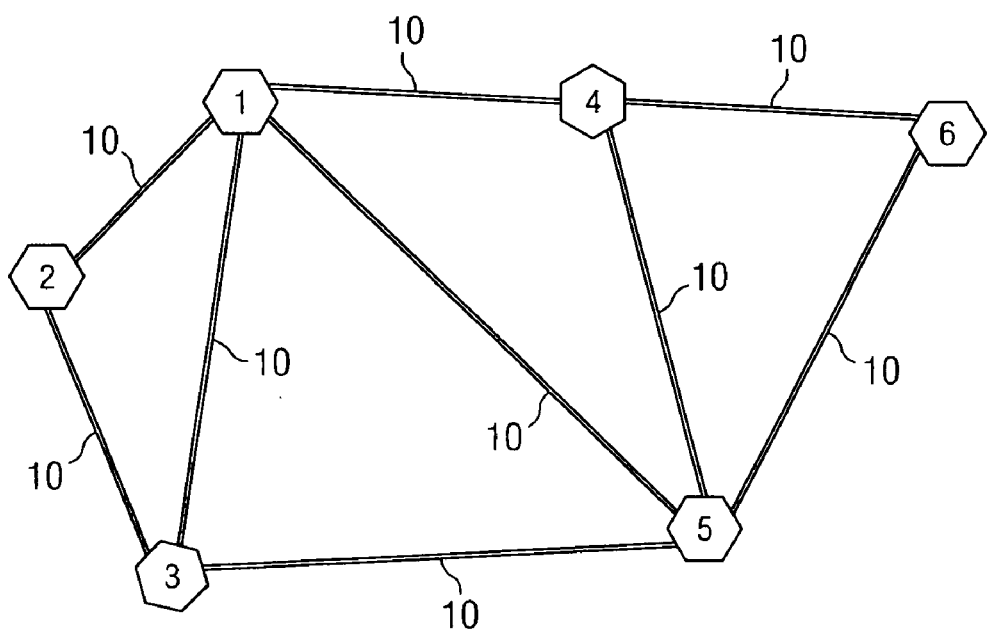

FIGS. 2C, 2D, and 2E illustrate a linkage of a plurality of nodes in a portion of a communication system, according to an embodiment of the invention, while FIG. 3 is a flowchart illustrating a process of alignment and discovery of nodes, according to an embodiment of the invention. With reference to FIGS. 2C, 2D, 2E and 4, the process 200 may begin by discovering unprocessed neighbor nodes within a particular node's operating range at step 210. "Unprocessed" neighbor nodes may generally refer to nodes that the particular node has not yet currently processed in attempting to establish communications. In particular embodiments, step 210 of process 200 may be at least partially connected to step 120 of process 100 of FIG. 3. Additionally, in particular embodiments, step 210 may create a list of nodes to be processed.

The process 200 may proceed by sorting unprocessed neighbor nodes by their distance from the current node at step 220. In particular embodiments, the sorting at step 220 may be a sorting of a list created at step 210. After sorting, the particular node may request a link with the nearest unprocessed neighbor. After requesting this link with another node, the process 200 may enter a decisional step 240 of considering whether the requested link crosses another existing link.

Upon receiving a "no" decision at step 240, the process 200 proceeds to establishing the link at step 270, and announcing to nodes in the operating area that the link has been established at step 280. For example, with reference to FIG. 2C, node 6 may request a link with node 4, the nearest neighbor. Upon discovering that the proposed link does not cross another link, the link 10 between node 4 and 6 may be created and announced to the remaining nodes 1 through 6 in the operating area.

After this announcement, the node (e.g., node 4) is marked as processed at step 290 and the decisional step of 300 considers whether there are any more nodes, for example, by consorting a list that may be created at step 210 and sorted at step 220. If so, the current node loops back to step 230 to request a link with the next nearest unprocessed node. For example, with reference to FIG. 2C, the next nearest unprocessed node would be node 5. When node 4 begins its own linking process 200 as seen in FIG. 2C, node 6 will be considered a "processed" node because a link has already been established as discussed above. Accordingly, node 4 may only request links with nodes 5 and 1.

If a "yes" decision is received at step 240, the process may be proceed in a manner illustrated in FIG. 2D. For example, node 3 may request a link 10 with node 4; however, node 1 already has a link 10 with node 5 and the requested link 10 between node 3 and node 4 would cross the link 10 between node 1 and 5. In determining that the link 10 between node 3 and node 4 would cross the link 10 between node 1 and 5, node 3 may communicate with its neighbors, for example node 1 and node 5. As referenced above, at step 280 links 10 between nodes are announced to the remaining operational area. node 3 will therefore be aware that the requested link 10 between nodes 3 and 4 will cross the existing link 10 between nodes 1 and 5. Accordingly, the process 200 will proceed to decisional step 250, which considers which of the two links (link 10 between nodes 3 and 4 or link 10 between nodes 1 and 5) should be kept.

In establishing the polygonal operating sectors controlled by a particular node, the polygons will preferably form equilateral triangles to optimize coverage. Therefore, a preferred link between two crossing links will be the shorter link. Accordingly, if the decisional step 250 determines that the requested link is not shorter than the existing the length, the process 200 will not create the existing length, but rather will proceed to step 290, marking the node as processed and proceeding to consideration of further nodes at step 300. However, if the decisional step 250 determines that the requested link is shorter than the existing link, the process 200 will proceed to step 260 where the existing link 10 will be discarded or taken down. For example, the requesting node may inform its neighbor nodes that the existing link 10 needs to be taken down to allow the requested link 10 to be established. In some embodiments, the requested link 10 may first be established before the existing link 10 is taken down. Taking down an existing link 10 and replacing with a requested link 10 may change in some embodiments the polygonal operating sectors controlled by nodes.

After the processing through process 200, the portion 50 of a communication system may taken on a configuration similar to FIG. 2E. Each node 1 through 6 generally has at least one polygonal operating sector which it communicates with. With the description of process 200, it will be understood that in some embodiments of the invention, nodes will not engage in process 100, but only process 200.

Figure 5A:
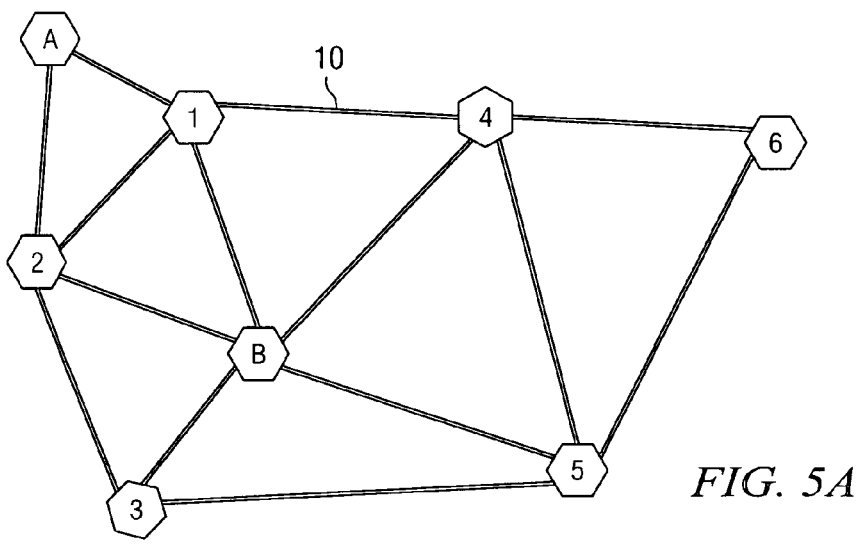
FIGS. 5A, 5B, and 5C illustrate the adding and removing of nodes to an existing portion of the communication system, according to an embodiment of the invention.

FIG. 5A illustrate the adding of nodes A and B to an existing portion 50 of the communication system, according to an embodiment of the invention. The existing portion 50 of the communication system, for example, may be similar to that shown in FIG. 2E. The addition of node A and B to the existing portion 50 of the communication system may proceed in a similar manner to that described above with reference to the processes 100 of FIG. 3 and the process 200 of FIG. 4. For example, nodes A and B, upon being deployed may transmit an initialization message to the remaining nodes and/or align themselves for optimal communication with such nodes. In such processing of new nodes A and B, one or both of the new nodes or existing nodes may engage in the process 200. For example, in some embodiments nodes 1-6, upon receiving an initialization message may attempt to establish a link with node A by returning to process 200. In other embodiments, only node A may engage in the process 200 of linking with one or more of nodes 1-6. In yet further embodiments both nodes A and nodes 1-6 may engage in the process 200 of establishing links.

In establishing the new node A of FIG. 5A, no existing links were crossed. Accordingly, the addition of node A only creates new links. In establishing new node B, the requested links would cross existing links. Accordingly, as seen with reference to FIGS. 2E and 5A, existing links 10 between node 1 and node 5 and between node 1 and node 3 have been removed to allow five links between node B and each of the respective nodes 1, 2, 3, 4, and 5.

Figure 5B:
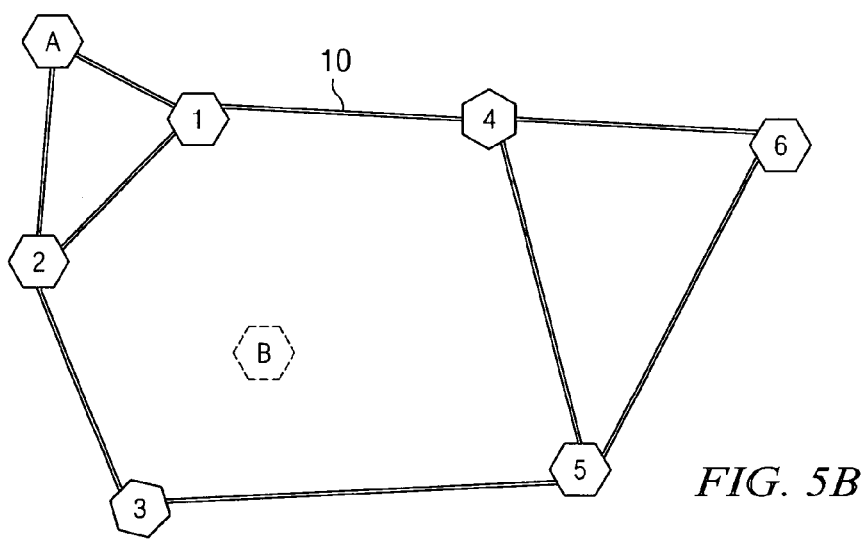
Figure 5C:
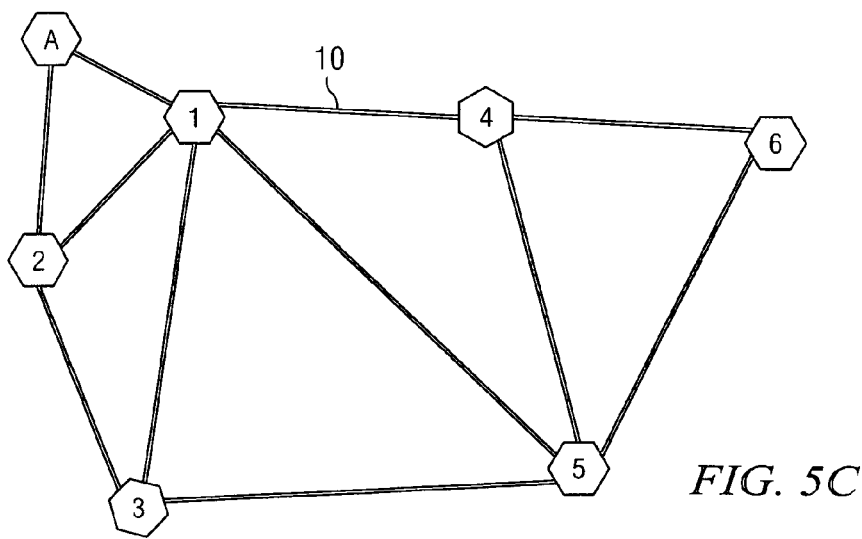

FIGS. 5A, 5B and 5C illustrate the removal of node B from a portion 50 of the communication system, according to an embodiment of the invention. Assuming the portion 50 of the communication system currently has a configuration as shown in FIG. 5A, node B has five links 10 with each of the respective nodes 1, 2, 3, 4, and 5 in the portion 50 of the communication system. If, for some reason, node B were either voluntarily or involuntarily terminated, five links 10 with each of the respective nodes 1, 2, 3, 4, and 5 would be removed as seen in FIG. 5C. Accordingly, with such a removal of a node B, each of the respective nodes 1, 2, 3, 4, and 5 may begin the process 200 of linking with other nodes to arrive in the configuration of FIG. 5C. Thus, as can be seen above, a node may engage in a process 200, among other times, upon initial deployment, detection of new node, or detection of a terminated node. The detection of a termination of a node in some embodiments may be a message transmitted to a particular node, informing the particular node that its neighbor is being taken out of commission. In further embodiments as described below with the reference to the process 400 of FIG. 6, a node may engage in a process 200 upon determination that a neighbor node, which the node currently maintains a link with, has moved.

Figure 6:
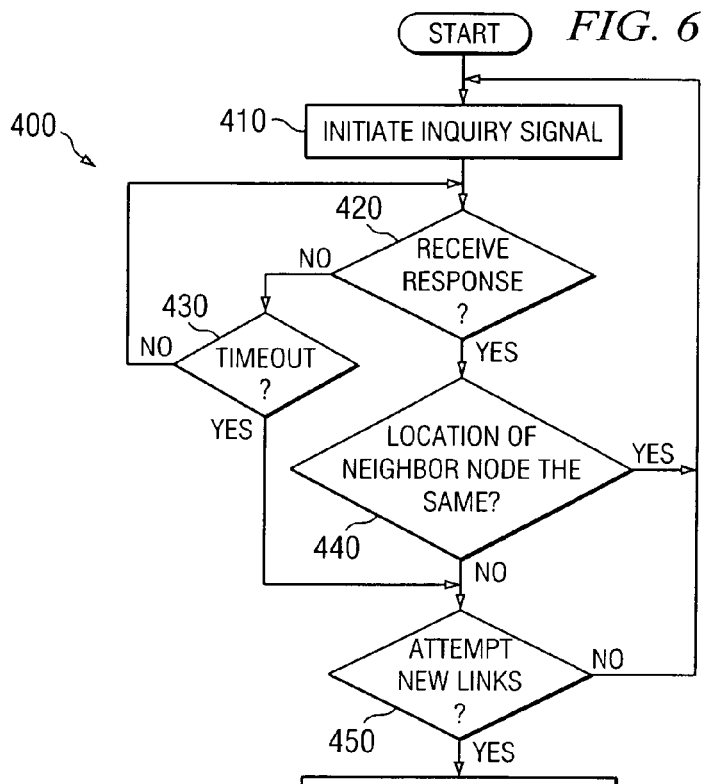
FIG. 6 is a flowchart illustrating a process of one node monitoring a linked neighbor node, according to an embodiment of the invention.

FIG. 6 is a flowchart illustrating a process 400 of one node monitoring a linked neighbor node, according to an embodiment of the invention. The process 400 may be utilized for each link in which a particular node maintains communication with another node. The process 400 may begin at step 410 by an initiating of an inquiry signal. Among other items, the inquiry signal may contains questions, such as "are you still alive?" and "have you moved?".

The process 400 may then proceed to the decisional step 420 to determine whether a response was received for the inquiry signal. If so, the process 400 may proceed to decisional step 440. If not, the process 400 may proceed to decisional step 430.

At decisional step 440, the process 400 considers whether the location of the neighbor node is the same. If so, the process may loop back to step 410. If not, the process 400 may proceed to decisional step 450.

At decisional step 430, the process 400 determines whether a response timeout has occurred. The timeout, for example, may be a particular time period for which a response from the linked node is expected to be received. If the timeout has not occurred, the process may loop back to step 420, waiting for a response. If a timeout has occurred, the process may proceed to decisional step 450.

At decisional step 450, the process considers whether new links should be attempted to be created, for example, through process 200 of FIG. 4. In making this determination, the process may consider how much a particular neighbor node has moved, for example, when the routed from decisional step 440 and how many times an inquiry signal has been sent to a neighbor node without a response being received, for example, when routed from decisional step 430. In either circumstance, such inquiries may be measured against thresholds. One example threshold may be: attempt new links when a neighbor node has not responded after three inquiry signal attempts. Another example threshold may be: attempt new links when neighbor node moves beyond a certain distance. Where a determination is made for a new link at decisional step 450 that was routed from a timeout 430, a notification may be given that the neighbor node is no longer considered alive. If an affirmative determination is made a step 450, the process 400 may proceed by attempting links in process 200, described with reference to FIG. 4. The process 400 may then be repeated with any new links that are established.

Figure 7:
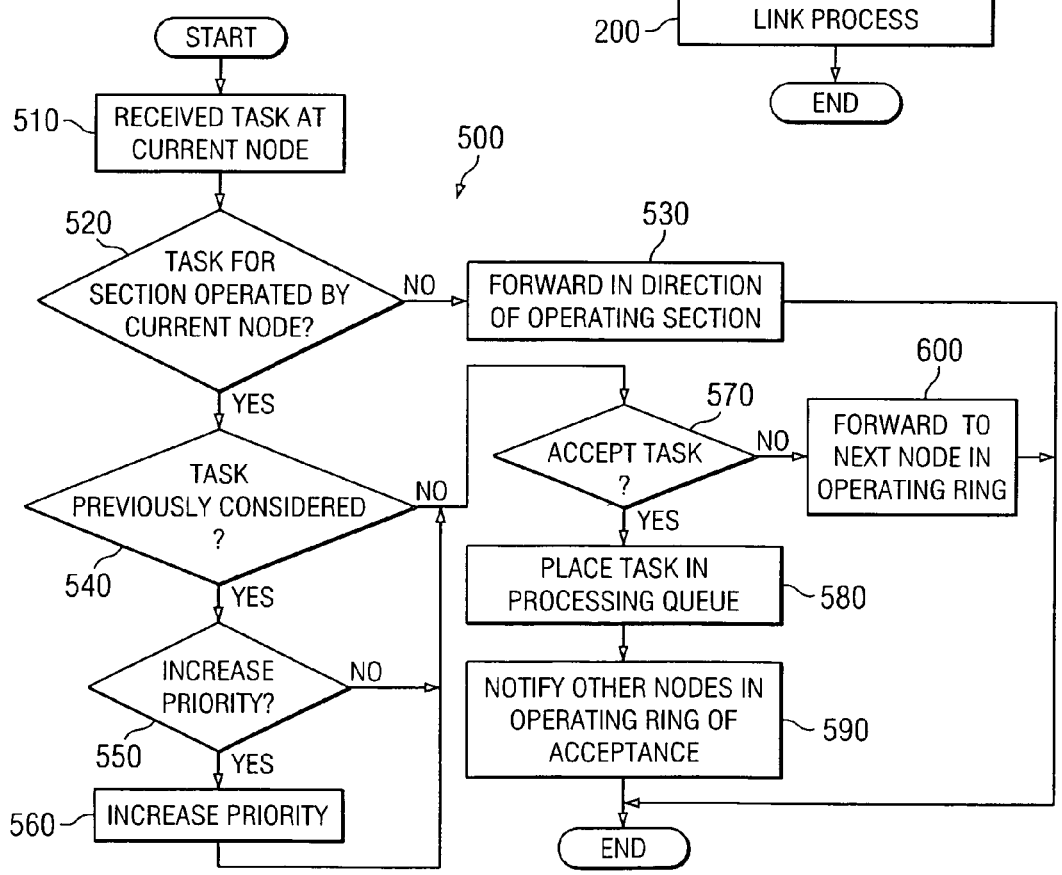
FIG. 7 is a flowchart illustrating a process of routing message from one node to another, according to an embodiment of the invention.

FIG. 7 is a flowchart illustrating a process 500 of routing message from one node to another, according to an embodiment of the invention. With such a process 500, tasks may be routed to various embodiments without a central communication with every node. The process 500 may begin at step 510 in which a current node receives a task to be processed. For example, with reference to FIG. 5A, node 6 may receive a task to be processed.

The process 500 proceeds to decisional step 520 in which the current node considers whether the location of the task is in an operating sector operated by the current node. If not, the task is routed in the direction of the operating sector at step 530. For example, with reference to FIG. 5A, the task may be intended for an area within operating sector defined between nodes A, 1, and 2. Accordingly, node 6 may forward the message to one or both of nodes 4 and 5, which may then forward the task again in the direction of the area within operating sector defined between nodes A, 1, and 2. If the location of the task is in an operating sector operated by the current node, the process 500 may proceed to decisional step 540 where a determination may be made as to whether the task has already been considered. If not, the process may proceed to decisional step 570. If so, the process may proceed to decisional step 550.

At decisional step 570, the process 500 may determine whether or not the task should be accepted by the current node. Among other items that may be considered in this determination may include the priority of the task and the number of other tasks which the current node is processing. If the current node decides not to accept the task, the task may be forwarded to the next node in an operating ring at step 600. An operating ring may be the nodes surrounding an operating sector. For example nodes A, 1, and 2, are in an operating ring for the operating sector defined by nodes A, 1, and 2. Accordingly, if node A doesn't take a task within the operating sector between nodes A, 1, and 2, node A will forward the task to node 1, which will forward the task to node 2, which will forward the task back to node A. The next node in the operating ring may similarly engage in the process 500. If the current node decides to accept the task, the task is placed in the current nodes processing queue at step 580 and the other nodes in operating ring are notified of task at step 590. If for some reason, the particular node becomes non-operational, another node in the operating ring will have the task information and may begin to process those task items not finished by the non-operational node.

Moving back to step 550, a consideration may be given to increase the priority of a particular task. For example, a task may completely circle an operating ring, not being accepted by any node. In determining whether the priority of the task should increased, a variety of parameters may be considered, including how many times the task has been considered and when the task should be completed. If decisional step 550 makes an affirmative determination, the priority of the task is increased at step 560 and the process 500 proceeds to decisional step 570. If decisional step 550 makes a negative determination, the process 500 proceeds to step 570.

In accomplishing the steps of the various steps of the various processes described above, any suitable software, including logic stored in non-transitory storage media, hardware, or combination of hardware and software may be utilized.

As can be seen with reference to various embodiments described above, the portion 50 of the communication system may operate as a self-organizing and self-healing system. Additionally, in the communication above, each of the nodes may communicate with one another or objects 20 within in an operating sector or operating region in an asymmetric manner.

Although the present invention has been described with several embodiments, a myriad of changes, variations, alterations, transformations, and modifications may be suggested to one skilled in the art, and it is intended that the present invention encompass such changes, variations, alterations, transformation, and modifications as they fall within the scope of the appended claims.

What is claimed is:

1. A method of dynamically creating a wireless network of a plurality of nodes operable to communicate with objects in operating sectors, the method comprising:
   determining, at a first node, a location of the first node;
   discovering, at a first node, unprocessed neighbor nodes within an operating range of the first node;
   requesting, at a first node, a link with a second node, the second node representing the nearest unprocessed neighbor node; and
   establishing a first wireless communication link between the first node and the second node of the plurality of nodes upon determining that a first communicative line of sight of the first wireless communication link between the respective ones of the plurality of nodes would not cross a communicative line of sight of an existing wireless communication link in the network of the plurality of nodes between two of the plurality of nodes or upon determining that the first wireless communication link would be shorter than a communicative line of sight of any existing communication link in the network of the nodes between two of the plurality of nodes that the first communicative line of sight of the first wireless communication link would cross, each of the first node and the second node having operating sectors, and each of the first node and the second node operable to wirelessly communicate with objects in each respective operating sector of the first node and second node.

2. The method of claim 1, further comprising:
   discarding the existing wireless communication link that the first wireless communication link would cross upon determining that the first communication link would be shorter than the existing communication link.

3. The method of claim 1, further comprising:
   determining, with a wireless signal transmitted by the second node, if the first node is still alive;
   requesting a fourth wireless communication link between the second node and a fourth node of the plurality of nodes if the first node is no longer alive; and
   establishing the fourth wireless communication link between the second node and the fourth node upon determining that the fourth communication link would not cross an existing wireless communication link in the network of the plurality of nodes between two of the plurality of nodes or upon determining that the fourth communication link would be shorter than any existing communication link in the network of the nodes between two of the plurality of nodes that the fourth wireless communication link would cross, the fourth wireless communication link having a fourth communicative line of sight between the second node and the fourth node.

4. The method of claim 3, wherein
   the first communicative line of sight defines at least a portion of a boundary for a first operating sector, and
   the fourth communicative line of sight defines at least a portion of a boundary for a second operating sector.

5. The method of claim 1, comprising:
   determining, with the second node, if the first node has moved beyond a threshold distance; and
   requesting a fourth communication link between the second node and a fourth node of the plurality of nodes if the first node has moved beyond the threshold distance; and
   establishing the fourth communication link between the second node and the fourth node upon determining that the fourth wireless communication link would not cross an existing wireless communication link in the network of the plurality of nodes between two of the plurality of nodes or upon determining that the fourth wireless communication link would be shorter than any existing communication link in the network of the nodes between two of the plurality of nodes that the fourth wireless communication link would cross, the fourth wireless communication link having a fourth communicative line of sight between the second node and the fourth node.

6. The method of claim 1, further comprising:
   announcing, through a wireless communication, the existence of the first wireless communication link to other nodes in an operating area.

7. The method of claim 1, further comprising:
   aligning communication horizons of the first node prior to establishing the first wireless communication link and the third wireless communication link.

8. A method of communicating with objects, the method comprising:
   determining, at a first node, a location of the first node;
   discovering, at the first node, unprocessed neighbor nodes within an operating range of the first node;
   requesting, at the first node, a link with a second node, the second node representing the nearest unprocessed neighbor node; and
   defining a first operating sector as a boundary between communicative lines of sight between the first node, the second node, and a third node, each of the first node, the second node, and the third nodes operable to communicate with objects in the first operating sector;
   maintaining primary communication between the first node and a first object in the first operating sector;
   maintaining redundant communication between the second node and the first object in the first operating sector;
   maintaining redundant communication between the third node and the first object in the first operating sector; and
   in response to determining that the first node is no longer alive:
      transferring primary communication of the first node with the first object in the first operating sector to one of the second node or the third node; and
      requesting, at one of the second node or the third node, a link with a fourth node.

9. The method of claim 8, further comprising:
   handing off primary communication of the first node with the first object in the first operating sector to a new node upon determining that the first object will move from the first operating sector to a second operating sector, the new node operable to communicate with objects in the second operating sector.

10. The method of claim 8, wherein the first node is operable to communicate with objects in a second operating sector, further comprising:
    maintaining primary communication with the first node when the first object move from the first operating sector to the second operating sector.

11. The method of claim 8, further comprising:
    maintaining primary communication between the second node and a second object in the first operating sector;
    maintaining redundant communication between the first node and the second object in the first operating sector;
    maintaining redundant communication between the third node and the second object in the operating sector.

12. The method of claim 8, wherein the first node is operable to communicate with objects in a plurality of operating sectors, further comprising:
- receiving, at the first node, a task pertaining to a particular location;
- determining whether the location of the task is within one of the plurality of operating sectors to which the first node communicates; and
- forwarding the task to a new node if the location is not within one of the plurality of operating sectors to which the first node communicates.

13. The method of claim 8, wherein the first node is operable to communicate with objects in a plurality of operating sectors, further comprising:
- receiving, at the first node, a task pertaining to a particular location;
- determining whether the location of the task is within one of the plurality of operating sectors to which the first node communicates; and
- determining whether to accept the task if the location is within one of the plurality of operating sectors to which the first node communicates.

14. Logic encoded in non-transitory media that when executed is operable to:
- determine, at a first node, a location of the first node;
- discover, at the first node, unprocessed neighbor nodes within an operating range of the first node;
- request, at the first node, a link with a second node, the second note representing the nearest unprocessed neighbor node; and
- establish a first communication link between a first node and a second node of a plurality of nodes upon determining that a first communicative line of sight of the first wireless communication link between the respective ones of the plurality of nodes would not cross a communicative line of sight of an existing communication link in a network of the plurality of nodes between two of the plurality of nodes or upon determining that the first wireless communication link would be shorter than a communicative line of sight of any existing communication link in the network of the nodes between two of the plurality of nodes that the first communicative line of sight of the first wireless communication link would cross.

15. The logic of claim 14, wherein the logic is further operable to:
- discard the existing wireless communication link that the first wireless communication link would cross upon determining that the first wireless communication link would be shorter than the existing wireless communication link.

16. The logic of claim 14, wherein the logic is further operable to:
- determine, with the second node, if the first node is still alive;
- request a fourth wireless communication link between the second node and a fourth node of the plurality of nodes if the first node is no longer alive; and
- establish the fourth communication link between the second node and the fourth node upon determining that the fourth wireless communication link would not cross an existing wireless communication link in the network of the plurality of nodes between two of the plurality of nodes or upon determining that the fourth wireless communication link would be shorter than any existing communication link in the network of the nodes between two of the plurality of nodes that the fourth wireless communication link would cross, the fourth wireless communication link having a fourth communicative line of sight between the second node and the fourth node.

17. The logic of claim 14, wherein the logic is further operable to:
- determine, with the second node, if the first node has moved beyond a threshold distance; and
- request a fourth wireless communication link between the second node and a fourth node of the plurality of nodes if the first node has moved beyond the threshold distance; and
- establish the fourth wireless fourth communication link between the second node and the fourth node upon determining that the fourth wireless communication link would not cross an existing wireless communication link in the network of the plurality of nodes between two of the plurality of nodes or upon determining that the fourth wireless communication link would be shorter than any existing communication link in the network of the nodes between two of the plurality of nodes that the fourth wireless communication link would cross, the fourth wireless communication link having a fourth communicative line of sight between the second node and the fourth node.

18. The logic of claim 14, wherein the logic further operable to:
- establish a second wireless communication link between the second node and a third node of the plurality of nodes upon determining that the second wireless communication link between the respective ones of the plurality of nodes would not cross an existing wireless communication link in the network of the plurality of nodes between two of the plurality of nodes or upon determining that the second wireless communication link would be shorter than any existing communication link in the network of the nodes between two of the plurality of nodes that the second communication link would cross, the second wireless communication link having a second communicative line of sight between the second node and the third node;
- establish a third wireless communication link between the first node and the third node of the plurality of nodes upon determining that the third wireless communication link between the respective ones of the plurality of nodes would not cross an existing wireless communication link in the network of the plurality of nodes between two of the plurality of nodes or upon determining that the third wireless communication link would be shorter than any existing communication link in the network of the nodes between two of the plurality of nodes that the third wireless communication link would cross, the third wireless communication link having a third communicative line of sight between the first node and the third node, the first communicative line of sight, the second communicative line of sight, and the third communicative line of sight defining boundaries of a first operating sector, and each of the first, second, and third nodes being redundant of one another in the first operating sector.

\* \* \* \* \*

UNITED STATES PATENT AND TRADEMARK OFFICE
CERTIFICATE OF CORRECTION

PATENT NO. : 8,155,027 B2
APPLICATION NO. : 11/185282
DATED : April 10, 2012
INVENTOR(S) : Timothy D. Smith et al.

It is certified that error appears in the above-identified patent and that said Letters Patent is hereby corrected as shown below:

IN THE SPECIFICATIONS:

In column 3, line 16, delete "an" and insert -- and --, therefor.

In column 3, line 18, after "as" delete "a".

In column 6, line 3, delete "node" and insert -- Node --, therefor.

IN THE CLAIMS:

In column 9, line 11, in Claim 1, delete "a" and insert -- the --, therefor.

In column 9, line 13, in Claim 1, delete "a" and insert -- the --, therefor.

In column 9, line 33, in Claim 1, delete "and" and insert -- and the --, therefor.

In column 9, line 37, in Claim 2, delete "first" and insert -- first wireless --, therefor.

In column 9, line 38, in Claim 2, delete "existing" and insert -- existing wireless --, therefor.

In column 9, line 47, in Claim 3, delete "fourth" and insert -- fourth wireless --, therefor.

In column 9, line 50, in Claim 3, delete "fourth" and insert -- fourth wireless --, therefor.

In column 9, line 62, in Claim 5, delete "comprising:" and insert -- further comprising: --, therefor.

In column 9, line 65, in Claim 5, delete "fourth" and insert -- fourth wireless --, therefor.

In column 10, line 1, in Claim 5, delete "fourth" and insert -- fourth wireless --, therefor.

Signed and Sealed this
Third Day of July, 2012

David J. Kappos
*Director of the United States Patent and Trademark Office*

CERTIFICATE OF CORRECTION (continued)
U.S. Pat. No. 8,155,027 B2

In column 10, line 34, in Claim 8, delete "with" and insert -- with the --, therefor.

In column 11, line 31, in Claim 14, delete "first" and insert -- first wireless --, therefor.

In column 11, line 31, in Claim 14, delete "a" and insert -- the --, therefor.

In column 11, line 32, in Claim 14, delete "a" and insert -- the --, therefor.

In column 11, line 36, in Claim 14, delete "existing" and insert -- existing wireless --, therefor.

In column 11, line 59, in Claim 16, delete "fourth" and insert -- fourth wireless --, therefor.

In column 12, line 15, in Claim 17, after "wireless" delete "fourth".

In column 12, line 28, in Claim 18, delete "logic" and insert -- logic is --, therefor.

In column 12, line 40, in Claim 18, delete "second" and insert -- second wireless --, therefor.